United States Patent
Kram et al.

[11] Patent Number: 6,134,032
[45] Date of Patent: Oct. 17, 2000

[54] METHOD AND APPARATUS FOR AUTOMATICALLY IDENTIFYING SYSTEM FAULTS IN AN OPTICAL COMMUNICATIONS SYSTEM FROM REPEATER LOOP GAIN SIGNATURES

[75] Inventors: Richard Kram, Tinton Falls; Jonathan Liss, Marlboro; Peter Theophall, Eatontown, all of N.J.

[73] Assignee: Tyco Submarine Systems Ltd., Morristown, N.J.

[21] Appl. No.: 09/285,581

[22] Filed: Apr. 2, 1999

[51] Int. Cl.[7] .................................................. H04B 10/08
[52] U.S. Cl. ......................... 359/110; 359/161; 359/173; 359/177
[58] Field of Search .................................... 359/110, 177, 359/173, 161

[56] References Cited

U.S. PATENT DOCUMENTS 5,343,320  8/1994  Anderson ................................. 359/160
5,969,833  10/1999  Jensen ..................................... 359/110

*Primary Examiner*—Leslie Pascal
*Assistant Examiner*—Hanh Phan

[57] ABSTRACT

A method is provided for automatically identifying a system fault in an optical communication system that includes first and second transmission paths for supporting bidirectional communication. In accordance with the method, measurements are made of a plurality of optical gain values respectively generated by a plurality of optical amplifier units disposed in respective loop back paths extending through the first and second transmission paths of the optical communication system. A gain signature is obtained by subtracting a plurality of baseline values from the plurality of optical gain values. Directional state changes are located along the gain signature to identify a plurality of directional states. Each of the directional states is assigned a pre-established state such that the gain signature is represented by a sequence of pre-established states. The sequence of pre-established states of said gain signature is compared to a plurality of predetermined sequences of pre-established states. The predetermined sequences each correspond to a known fault condition. At least one exact match is identified between the sequence of pre-established states of the gain signature and the pre-determined sequences. The matching predetermined sequence identifies the system fault that gives rise to the gain signature.

20 Claims, 6 Drawing Sheets

| State | Description |
|---|---|
| STATE 1 | IC: Zero (within nominal dB window) |
| STATE 2 | IC: Negative (below nominal dB window) |
| STATE 3 | Level (no gain change within nominal window) |
| STATE 4 | Rising (incrementing) gain change(s) through an established threshold |
| STATE 5 | Single Falling (decrementing) gain change through an established threshold |
| STATE 6 | Single falling gain change to noise floor |

METHOD AND APPARATUS FOR AUTOMATICALLY IDENTIFYING SYSTEM FAULTS IN AN OPTICAL COMMUNICATIONS SYSTEM FROM REPEATER LOOP GAIN SIGNATURES

FIELD OF THE INVENTION

The present invention relates generally to a line monitoring system employed in an optical communications system, and more particularly to a line monitoring system that automatically identifies system faults from repeater loop gain signatures.

BACKGROUND OF THE INVENTION

Commercial optical systems use optical fibers to carry large amounts of multiplexed digital data over long distances from a transmitting terminal to a receiving terminal. The maximum distance that the data can be transmitted in the fiber without amplification or regeneration is limited by the signal loss and dispersion associated with the optical fiber. To transmit optical signals over long distances, the lightwave systems normally include a number of repeaters periodically located along the fiber route from the transmitting terminal to the receiving terminal. Each repeater boosts the optical input signal to compensate for the transmission losses which occurred since passing through the last previous repeater. Prior to the widespread availability of efficient optical amplifiers, many systems employed repeaters which converted the optical signals into electrical signals for amplification by conventional electrical amplifiers. The amplified electrical signals were then reconverted to the optical domain, for further transmission along the optical communication path. The advent of reliable and low cost optical amplifiers has obviated the need to convert signals into the electrical domain for amplification.

Optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The doped fiber exhibits gain at the wavelength of the communication signal, providing the desired amplification. If the optical fiber is doped with erbium, for example, pump energy may be provided at a wavelength of 1480 nm or 980 nm, which coincide with the absorption peaks of erbium.

Optical communications systems often employ a line monitoring system (LMS) to monitor the performance of the repeaters. The line monitoring system includes line monitoring equipment (LME) located in the terminal stations and high-loss loop-back paths (HLLB) in the repeaters and terminals. The HLLBs optically couple the two fibers of a fiber pair (one in each direction of transmission) such that a very small portion of the optical signal originating at a transmitting terminal and being transmitted on one of the fibers of the pair is looped back and coupled into the fiber that is transmitting in the reverse direction back toward the sending terminal. The fundamental quantity measured by the LME is the round-trip loop gain between the LME and each terminal and repeater HLLB on a fiber pair. Through routine analysis of the measured loop gains, the LMS can be used to detect changes in the performance of the portion of the system spanned by the monitored repeaters and terminals over time. In particular, the analysis may reveal that these changes may be due to different causes, such as degradations in pump power, variations in the loss in the amplifier output stage, changes in the fiber loss in the transmission span, and amplifier gain changes, for example.

To recognize line faults and other problems from the analysis of loop gain measurements, as described herein, the transmission system must produce a loop gain behavior under fault and problem conditions which is significantly different from its normal behavior. This is clearly the case under the extreme situations of fiber and/or cable breaks, independent of the repeater design, primarily because loop gain measurements beyond the break show that the system is open (i.e., infinite loss). For other more subtle problems, the capability of locating and identifying the problem depends strongly on the type of optical amplifiers used in the system. Many modern repeater designs employ optical amplifiers which dynamically change their gain to correct for moderate loss changes in the fiber between the repeaters. With such amplifiers, if a loss change occurs in the fiber between two repeaters, the loss change is compensated by the aggregate gain changes that occur in the next several repeaters, each one compensating for successively smaller portions of the fiber loss change, until the entire loss change has been equalized. The larger the loss change to be compensated, the more repeaters it takes to equalize the change. The loop gain measurements through the repeaters that have adjusted their gains will be different from the loop gain measurements through the same repeaters in the nominal case, and it is this difference which can be used to locate the loss change and determine its cause. Note that in a system where moderate loss changes are completely compensated by the automatic gain change in a single repeater, the measured loop gain through that repeater in the increased/decreased fiber loss case is identical to the measured loop gain through that repeater in the nominal case. For such situations, the fact that a change in the fiber loss has occurred is not detectable by comparison of the measured loop gain data for the two conditions.

The LMS is used to establish a baseline level of behavior that characterizes the loop gains in each fiber pair in the communications system in its normal operating state. By periodically monitoring round-trip loop gain changes that occur over time, deviations from the baseline behavior can be measured. Deviations from the baseline behavior are referred to as the signature of the measurement and are often indicative of a problem or fault in the system. Extreme faults include fiber and cable breaks and other problems that result in immediate loss of service. Other problems which are also detectable include amplifier power degradations and other loss variations over time, which may not have an immediate effect on the quality of service.

The HLLB signature is typically determined from the data shown in FIG. 1(a). In FIG. 1(a), the data points represent the values of the measured loop gains for each of the amplifier pairs in the sequence in which the amplifier pairs are encountered along the transmission path. That is, the first data point represents the loop gain from the LME to the first amplifier pair and the second data point represents the gain from the LME to the second amplifier pair, and so on. Curve 10 represents the baseline behavior and curve 12 represents data obtained during routine measurement. The difference between curves 10 and 12, shown in FIG. 1(b), is a visual representation of the signature of the gain measurement.

An ideal signature is a straight horizontal line running through a gain change of 0 dB, indicating that all the loop gain measurements from the amplifier pairs agree exactly with the pre-established baseline. Any deviation from such a signature is indicative of abnormal system operation, which is caused by a primary (critical) fault that stops transmission, such as a cable break, and possibly secondary (non-critical) faults that only degrade system performance, such as a decrease in amplifier gain. The particular nature of the fault in the communications system can often be determined from its signature. For example, a failure of one of the pump lasers driving an optical amplifier pair is characterized by a gain increase followed by a gain decrease that spans approximately six amplifier pairs.

Loop gain signatures are conventionally identified by visual inspection. That is, the nature of a fault is determined by visually comparing the measured signatures against a series of predetermined "library" signatures for which faults have been identified. The "library" signature that best matches the measured signature presumably defines the fault.

It would be advantageous to automate the process of identifying system faults from their loop gain signatures to assist the system operator in locating line faults and degradations which may lead to preemptive repair activity.

SUMMARY OF THE INVENTION

A method is provided for automatically identifying a system fault in an optical communication system that includes first and second transmission paths for supporting bidirectional communication. In accordance with the method, measurements are made of a plurality of optical gain values respectively generated by a plurality of optical amplifier units disposed in respective loop back paths extending through the first and second transmission paths of the optical communication system. A gain signature is obtained by subtracting a plurality of baseline values from the plurality of optical gain values. Directional state changes are located along the gain signature to identify a plurality of directional states. Each of the directional states is assigned a pre-established state such that the gain signature is represented by a sequence of pre-established states. The sequence of pre-established states of said gain signature is compared to a plurality of predetermined sequences of pre-established states. The predetermined sequences each correspond to a known fault condition. At least one exact match is identified between the sequence of pre-established states of the gain signature and the pre-determined sequences. The matching predetermined sequence identifies the system fault that gives rise to the gain signature.

DETAILED DESCRIPTION

Figure 2:
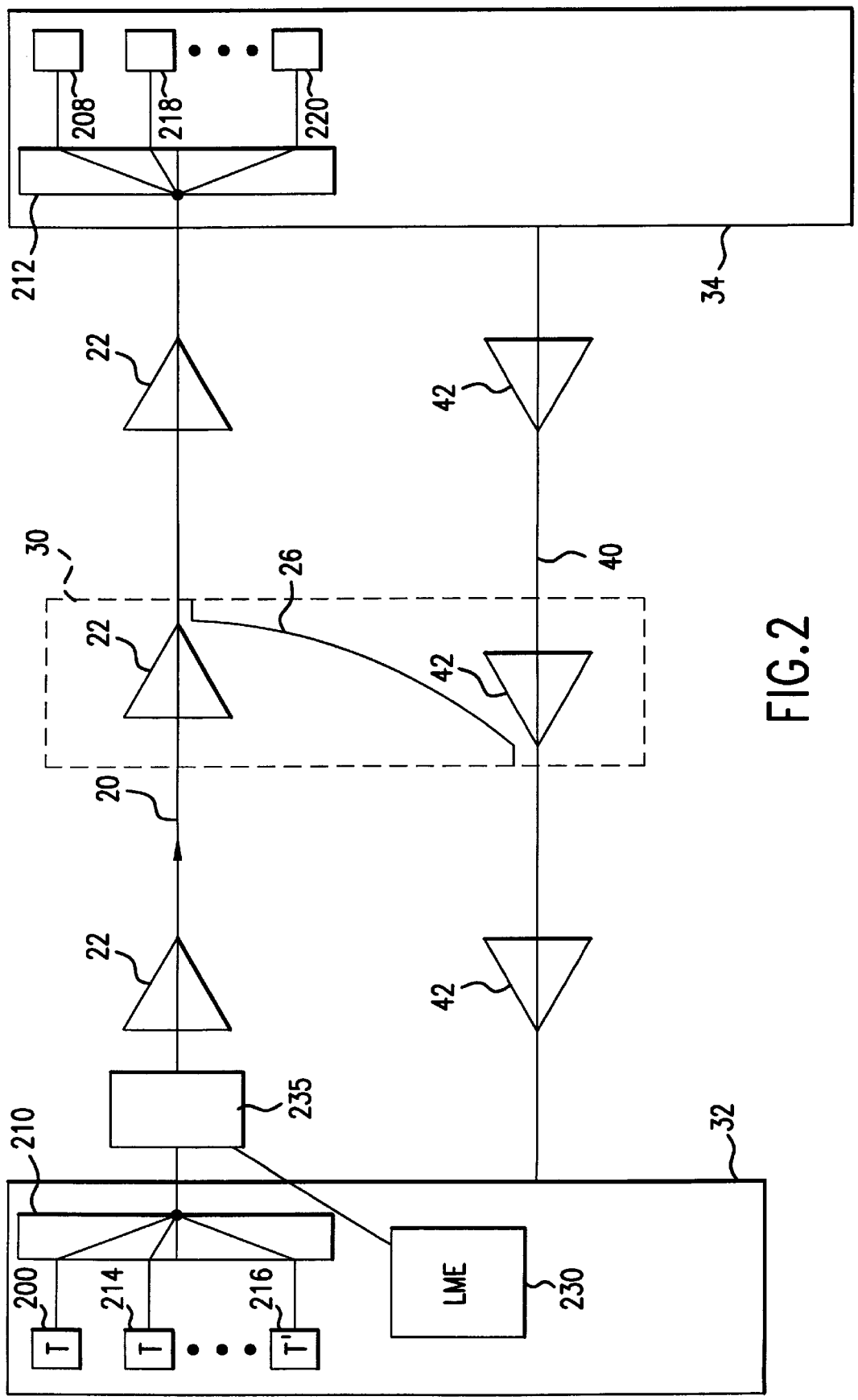
FIG. 2 shows a simplified schematic diagram of an optical communications system that employs repeaters containing optical amplifiers.

Referring to FIG. 2, there is disclosed a lightwave communications system which utilizes optical fiber amplifiers. The system includes transmitter/receiver terminals 32 and 34 and optical transmission fiber paths 20 and 40 supporting bidirectional communication. A plurality of optical amplifiers 22 and 42 are interposed in the fiber paths 20 and 40 between the transmitter/receiver terminals 34 and 32. Optical amplifiers 22 and 42 contain a length of doped fiber that provides a gain medium, an energy source that pumps the fiber to provide gain, and a means of coupling the pump energy into the doped fiber without interfering with the signal being amplified. These components of the optical amplifiers are shown in greater detail in FIG. 3.

As shown in FIG. 2 terminal 32 includes optical communication transmitters 200, 214 and 216 to transmit optical communications channels at wavelength $\lambda 1$, $\lambda 2$. . . $\lambda N$, respectively. Multiplexer 210 multiplexes these signals together to form a multiplexed signal that is launched into optical fiber 20 for transmission to the receiving terminal 34. At the receiving terminal 34, demultiplexer 212 demultiplexes and routes $\lambda 1, \lambda 2 \ldots \lambda N$ to receivers 208, 218 . . . 220, respectively. Of course, in a bidirectional communication system such as shown in FIG. 2, both terminals 32 and 34 serve as transmitters and receivers and hence, while not shown in FIG. 2 for purposes of clarity, each includes both transmitters and receivers.

Figure 3:
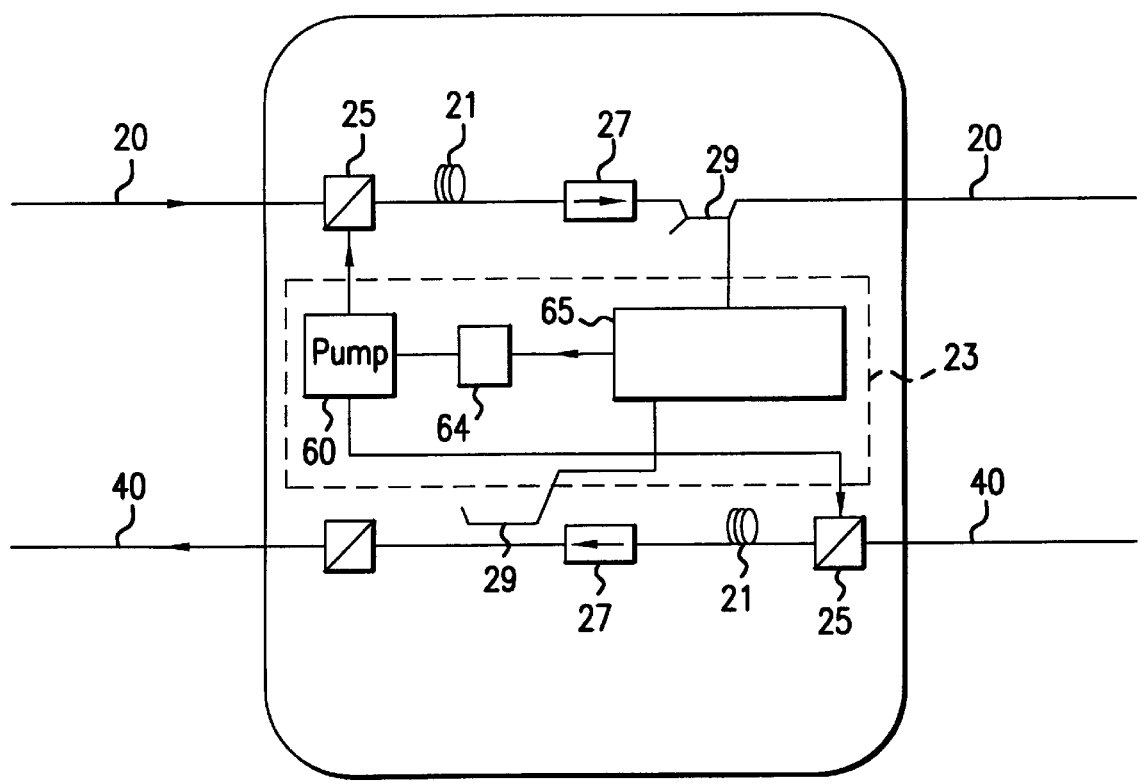
FIG. 3 shows a simplified diagram of one of the repeaters shown in FIG. 2.

Referring to FIG. 3, each optical amplifier includes a rare-earth doped optical fiber 21, such as an erbium doped fiber (EDF), coupled to a source of optical pump energy 60 via a coupler 25 such as a wavelength division multiplexer (WDM). An optical isolator 27 is typically located immediately downstream from each of the doped fibers. The isolator prevents amplified spontaneous emission from traveling back upstream and disrupting system stability by causing the amplifiers to oscillate. In undersea communication systems, pairs of such optical amplifiers supporting opposite-traveling signals on separate fiber pairs are housed in a single unit 30 (see FIG. 2) known as a repeater. The signals being transmitted from the terminals 32 and 34 are in optical form. There is no intermediate conversion to electrical form. While only three optical amplifier pairs are depicted in FIG. 2 for clarity of discussion, it should be understood by those skilled in the art that the present invention finds application in transmission paths of all lengths containing any number of such repeaters, though some signatures do not apply to systems that contain less than two repeaters.

FIG. 2 also shows a high loss loop back path 26 (HLLB) in repeater 30. The HLLB path couples a portion of the optical signal from transmission path 20 to transmission path 40 for analysis by the LME (which is shown to be located at terminal 32 in this example). Generally, although not shown in FIG. 2, each repeater in the transmission system will include such a HLLB path. In addition, though not shown in FIG. 2, each HLLB contains a path in both loop back directions. In simple terms, the HLLB 26 loopback path also couples a portion of the optical signal from transmission path 40 to transmission path 20. Thus, an LME located at terminal 34 would also be capable of monitoring the same fiber pair.

Referring to FIG. 3, the pump unit 23 provides the optical pump energy for both transmission directions of the amplifier pair. The pump unit 23 includes pump laser package 60, pump controller 64 and receiver 65. Pump laser package 60 generates an optical pump beam at a suitable wavelength for producing amplification in EDF 21. For erbium doped fibers, pump wavelengths in the neighborhood of 1480 nm or 980 nm are suitable. The pump controller 64 comprises a comparator and feedback circuit for powering and controlling the pump laser package 60. The receiver circuit 65 receives a portion of the optical signal tapped by couplers 29. The pump controller 64, responsive to signals from the receiver 65, applies current to pump laser package 60 to adjust the total output power generated by the pump laser package 60.

As indicated in FIG. 2, the communication system includes a line monitoring system (LMS) for monitoring the optical path between terminals to determine the status of the repeaters. In particular, the LMS determines changes and failures within each span of the system, including degradations of pump power, loss in the amplifier output stage, and loss in the transmission span.

Figure 1A:
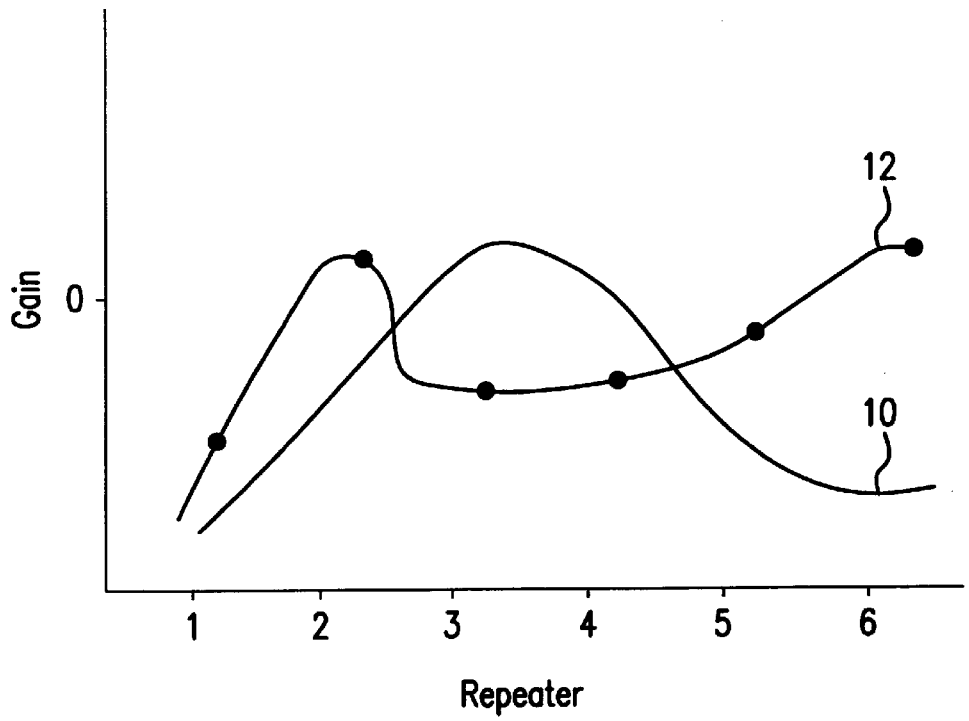
FIG. 1(a) shows loop gain measurements obtained from a series of HLLB's that are incorporated in optical amplifier pairs arranged in an optical communications system.
Figure 1B:
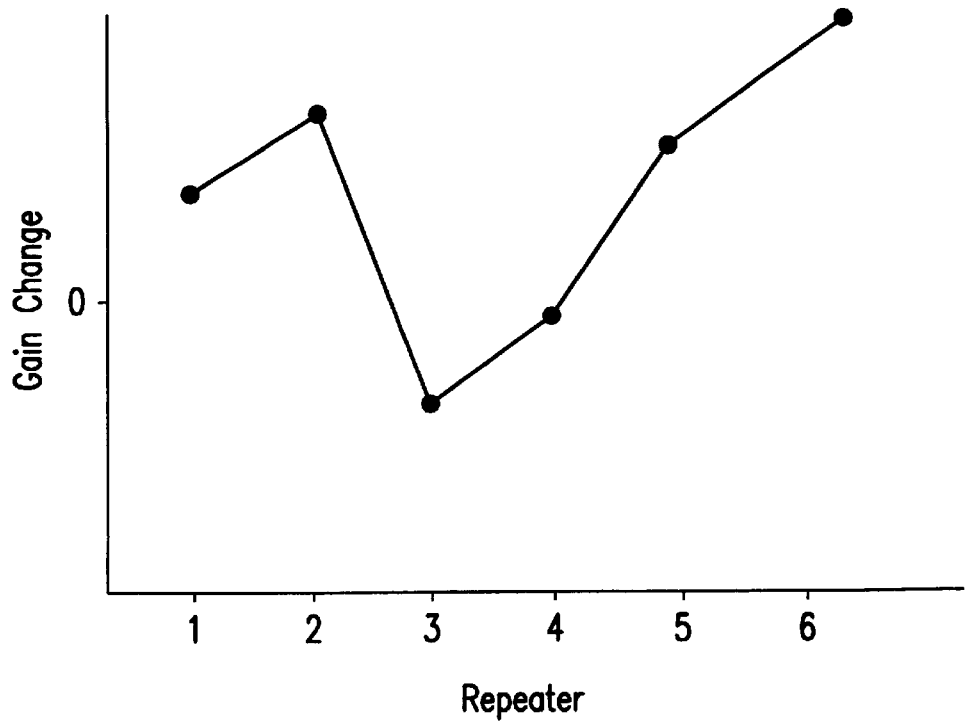
FIG. 1(b) shows the gain signature determined from the measurements shown in FIG. 1(a).

As previously mentioned, the LMS generates a loop gain signature as shown in FIG. 1. The signature denotes the deviation in system behavior from its nominal or baseline performance. While in principle ideal behavior would be represented by a measured signature that is a straight horizontal line, in practice, however, system noise and other transmission variations will normally occur. As a result, a nominal signature will actually have a random shape within some pre-established window about the zero line defining a nominal band of acceptability. A fault due to a cable break or a marginally operating amplifier will produce a signature that has a well defined shape outside the pre-established window. Accordingly, it is necessary to account for the nominal window so that normal noise-induced drift is not misinterpreted as unacceptable amplifier operation.

A primary issue that must be addressed in automating the analysis process is determining an appropriate way to store both the pre-established "library" signatures and the measured signatures. In accordance with the present invention, the "library" signatures are stored as a series of so-called directional state changes. A single or "level" signature state is represented by the portion of the signature extending over two or more amplifier pairs (i.e., the data points in FIG. 1), which may fall within the nominal window. A transition to another signature state normally arises when the signature exceeds (above or below) the nominal window. For example, FIG. 4 shows an illustrative signature for 10 amplifier pairs in which the nominal window is +/−0.5 dB.

Figures 4, 5:
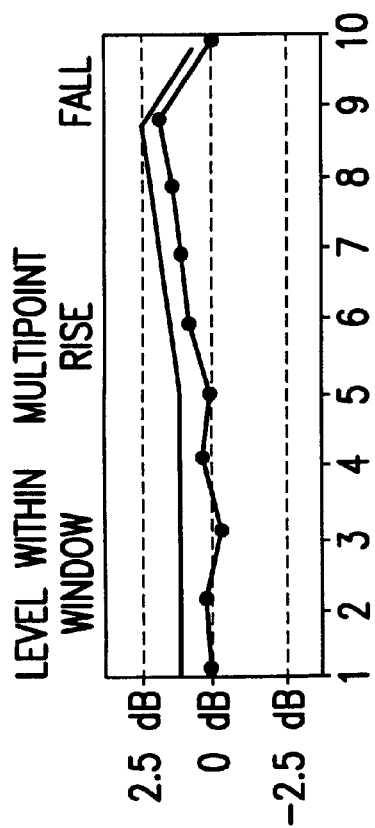
FIG. 4 shows an exemplary gain signature from which directional states are obtained.
FIG. 5 shows a table of exemplary predefined directional states that may be used to characterize a gain signature.

The 10 data points forming the signature shown in FIG. 4 can be decomposed into three directional states. The first state is a level state within the nominal window, which encompasses points 1–5. The second state may be defined as a rising state encompassing points 5–9. It should be noted that successive states may contain a common amplifier pair, which is clearly the case for states one and two. Finally, a third state may be defined as a falling state that encompasses points 9 and 10. The transition to the third state occurs at the point on the curve past point 9 where the 0.5 db window is exceeded.

The state structure shown in FIG. 4 can be further refined, if necessary, by imposing different windows and different thresholds for the nominal window at different points along the signature. In practice, the signature deviations outside the nominal window are expected to be larger than the deviations that occur inside the window. This behavior arises because any motion occurring outside the window is probably due to a fault, such as a major dB loss that the amplifiers will try to correct. In contrast, deviations within the nominal window are likely to be caused by noise. The complexity of the states themselves may also be increased, for example, by distinguishing between states that undergo a single point rise and those that undergo a multipoint rise. Such states may be useful in determining fine system degradations or when analyzing new amplifier signatures.

FIG. 5 shows six exemplary predefined directional states that may be used to characterize a signature. The six states include two initial condition states (states I and 2) and four states that represent basic dynamic states (states 4–6). A signature thus may be defined by a sequence of the individual states 1–6. Additional states may be employed by subdividing the four basic dynamic states. The additional states may help better differentiate some of types of faults that occur under real-world conditions, where more than one fault may occur in a line or where unexpected signature variations may arise due to noise. If desired, other states such as termination states also may be employed. In general, the states can be easily expanded or modified as required to remain current with updated signature detection techniques, to detect new signatures, and possibly to support new hardware that exhibits a modified set of signatures.

In principle, a measured signature will most likely exhibit nominal baseline behavior or a fully explainable fault condition. Some measured signatures, however, may exhibit unusual profiles that represent a series of faults. A series of faults may arise from a primary fault and one or more secondary faults that may be byproducts of the primary fault. In some circumstances it may be advantageous to filter out the secondary faults from the measured signature so that the primary fault can be clearly identified. Some simple filtering techniques that can be employed including limit filtering and smoothing filtering. Limit filtering at the floor will limit any values that are less than the prescribed floor threshold so that they are equal to the floor value. Thus, anything at or less than the floor threshold value will be reduced to the floor value. A similar method is also used to reduce all values within the nominal window to zero, which effectively eliminates unwanted state changes within the nominal window.

In smoothing filtering the signature profile is smoothed during rising segments to eliminate small random changes that occur within a specified window. The simplified segment will reduce the number of directional states that are established for the signature, thus producing fewer unwanted secondary fault conditions. Alternatively, a simple curve fitting routine may be imposed on the signature to obtain a single rising segment. In practice, the inventors have found that a series of alternating linear interpolations is effective to smooth a rising segment, particularly segments in which small dB changes frequently occur in a signature representing a break or other large loss in dB. Of course other filtering techniques than those previously described may be employed to remove the signatures of secondary faults. Generally, however, it is anticipated that most faults will be easily recognized without any filtering of secondary faults because of their unique signatures.

Figure 6:
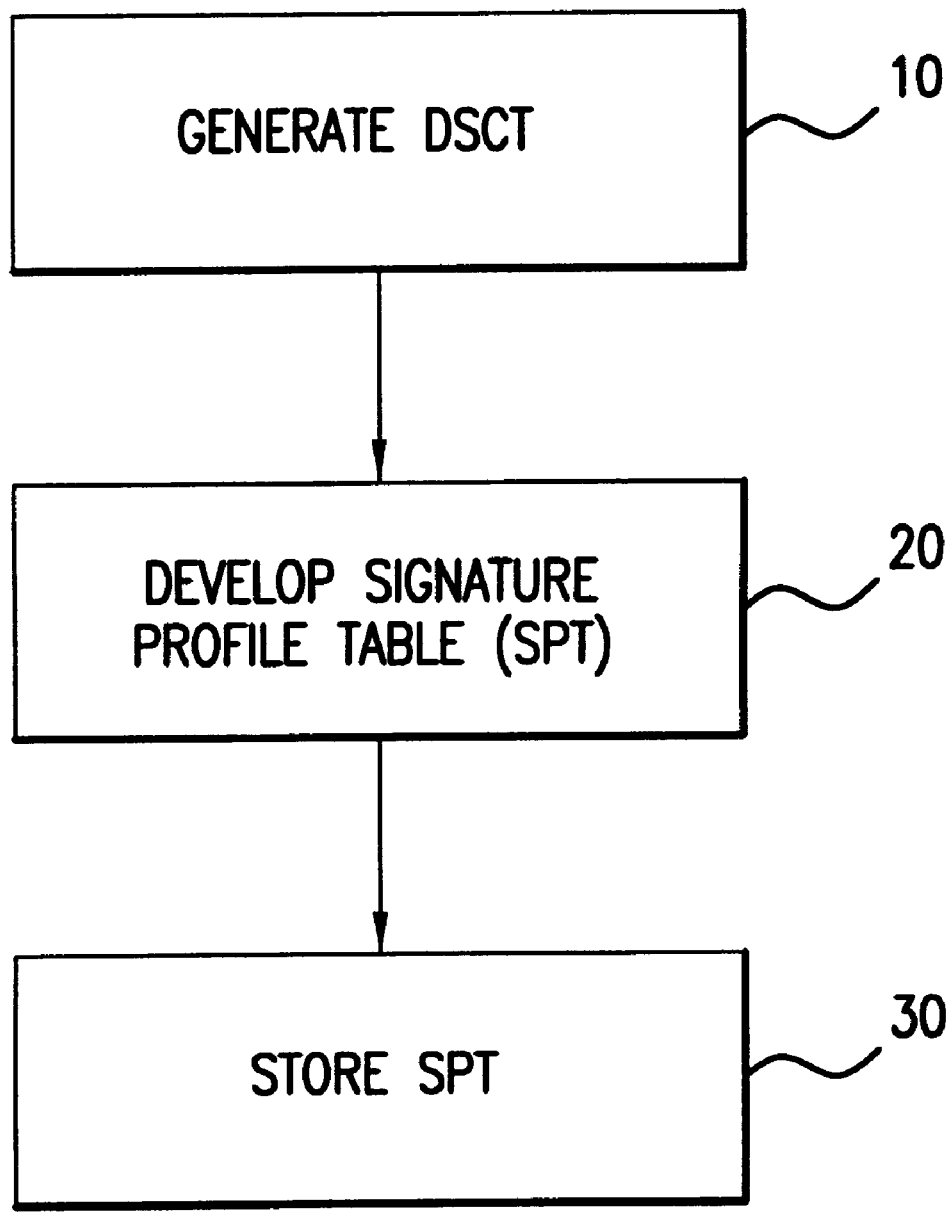
FIG. 6 is a flowchart of the steps performed in accordance with the present invention when defining the pre-established signatures.

FIG. 6 shows a flowchart of the steps that are performed in accordance with the present invention when defining the pre-established signatures. In step 10, a directional state change table (DSCT) is generated. The DSCT defines the fundamental directional states such as shown in FIG. 5. In step 20, a signature profile table (SPT) is developed. The SPT lists known system faults and their pre-established signatures, which are each defined by a different sequence of the directional states contained in the DSCT. In step 30, the SPT is electronically stored in a configuration file so that signatures may be updated and new signatures added without having to generate a new executable code image. This provides the ability to dynamically upgrade the signature analysis detection algorithm in the field.

Figure 7:
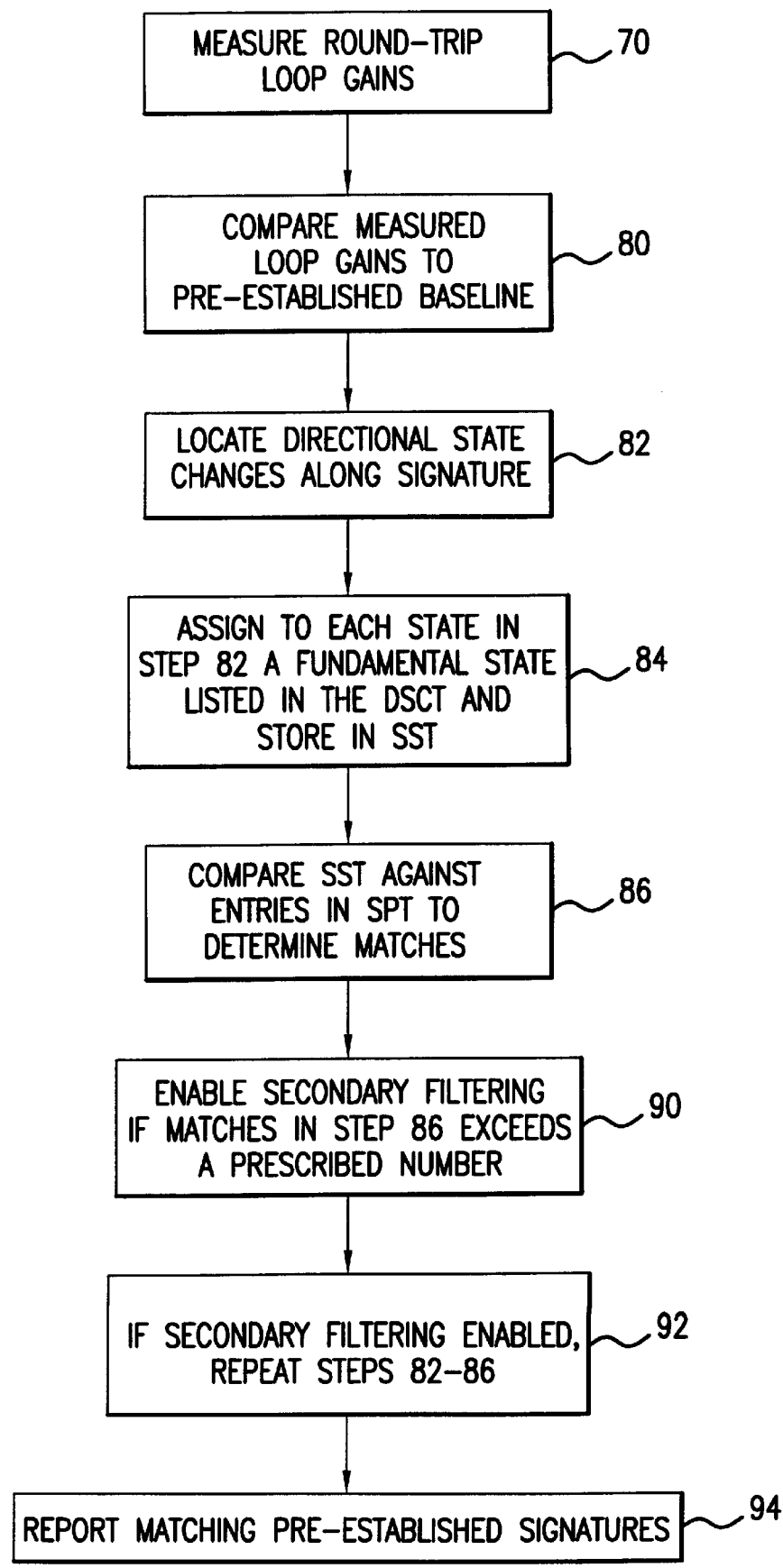
FIG. 7 shows a flowchart of the steps performed when comparing a measured signature against the pre-established signatures.

FIG. 7 shows a flowchart of the steps performed when comparing a measured signature against the pre-established signatures listed in the SPT. In step 70, the round trip loop gains from the repeaters are measured by the LMS and electronically stored. In step 80, the loop gains are compared to a pre-established baseline, with the difference between them defining the measured signature. In step 82, the signature is scanned from beginning to end and directional state changes are located using pre-established windows to account for noise. In step 84, each distinct directional state change is assigned one of the fundamental states listed in the DSCT. The sequence of measured states defining the measured signature is stored in a signature state table (SST). In step 86, the sequence of states in the SST is compared against successive entries in the SPT until a match is found.

The comparison of step 86 may be performed by a modified finite state engine optimized for signature analysis. The signature analysis state engine will set pointers to the beginning of the SST and the SPT. The state engine will successively compare states from the initial pointer position of the SST against the states for the current profile being matched in the SPT. If an exact match is found, the profile indication will be stored in the results table and the SPT pointer will be reset to the beginning of the SPT and the initial SST pointer position will be reset to the next state following the last state of the match. The whole process will be repeated until all signature states have been exhausted and all matches in the SST have been found. Thus, the algorithm detects all possible fault conditions in the data set that are not overlapping, not just the first one found. If none of the SPT profiles match the current SST sequence from the current SST pointer position, the SST pointer position will be advanced to the next state and the process continues as above. Once a match is found the matching entry in the SST is recorded. The comparison process continues to determine if other entries in the SPT match the sequence of states in the SST. If a match is found to a signature that corresponds to a fiber or cable break, the comparison process is discontinued, since the break is presumably the primary fault in the system and any data points stored after the break are not meaningful.

Steps 90 and 92 are to be performed only if secondary faults are to be filtered. In step 90, secondary filtering is enabled if the signature is matched to more than a prescribed number of entries in the SPT (e.g., 5). Steps 82, 84 and 86 are then repeated to determine if the filtered signature now matches a fewer number of the pre-established signatures, which are represented by the entries in the SPT. If so, the filtered signature is stored as a sequence of states in the SST. Finally, in step 94, the pre-established signatures that have been identified as matching are reported to a system operator for further action. Alternatively, if the system behavior is found to be nominal, this result is reported to the system operator. The report may be displayed on the graphical user interface of the LME and/or logged to a history file for subsequent analysis. In addition, if the LME has interfaces to higher-level network element managers or other centrally located operations centers, the report may also be sent over these interfaces to facilitate management of the optical transmission system being monitored by the LME.

What is claimed is:

1. A method for automatically identifying a system fault in an optical communication system that includes first and second transmission paths for supporting bidirectional communication, said method comprising the steps of:

measuring a plurality of optical gain values respectively generated by a plurality of optical amplifier units disposed in respective loop back paths extending through said first and second transmission paths of the optical communication system;

obtaining a gain signature by subtracting a plurality of baseline values from the plurality of optical gain values;

locating directional state changes along said gain signature to identify a plurality of directional states;

assigning to each of said directional states a pre-established state such that said gain signature is represented by a sequence of pre-established states;

comparing said sequence of pre-established states of said gain signature to a plurality of predetermined sequences of pre-established states, said predetermined sequences each corresponding to a known fault condition;

identifying at least one exact match between said sequence of pre-established states of said gain signature and said pre-determined sequences, said matching pre-determined sequence identifying the system fault that gives rise to said gain signature.

2. The method of claim 1 wherein said amplifier units each comprises a rare-earth doped optical fiber and a pump source for pumping said optical fiber.

3. The method of claim 2 wherein each of said optical amplifier units disposed in at least one of said loop back paths includes first and second optical amplifiers respectively disposed in said first and second transmission paths.

4. The method of claim 3 wherein said first and second optical amplifiers are housed in a repeater.

5. The method of claim 1 further comprising the step of filtering said gain signature to reduce effects of secondary faults.

6. The method of claim 5 wherein said filtering step comprises limit filtering.

7. The method of claim 5 wherein said filtering step comprises smoothing filtering.

8. The method of claim 5 wherein said filtering step is performed only if the number of said identified matches exceeds a predetermined amount.

9. The method of claim 1 wherein said comparing step is repeated until said system fault identified in said identifying step is a cable break.

10. The method of claim 1 wherein said directional states include level, rising and falling states.

11. The method of claim 1 further comprising the step of recognizing a directional state change only when a difference between said directional states exceeds a pre-established threshold.

12. An apparatus for identifying a system fault in an optical communication system that includes first and second transmission paths for supporting bidirectional communication, said method comprising the steps of:

means for measuring a plurality of optical gain values respectively generated by a plurality of optical amplifier units disposed in respective loop back paths extending through said first and second transmission paths of the optical communication system;

means for obtaining a gain signature by subtracting a plurality of baseline values from the plurality of optical gain values;

means for locating directional state changes along said gain signature to identify a plurality of directional states;

means for assigning to each of said directional states a pre-established state such that said gain signature is represented by a sequence of pre-established states;

means for comparing said sequence of pre-established states of said gain signature to a plurality of predetermined sequences of pre-established states, said predetermined sequences each corresponding to a known fault condition;

means for identifying at least one best match between said sequence of pre-established states of said gain signature and said pre-determined sequences, said best matching predetermined sequence identifying the system fault that gives rise to said gain signature.

13. The apparatus of claim 12 wherein said amplifier units each comprises a rare-earth doped optical fiber and a pump source for pumping said optical fiber.

14. The apparatus of claim 13 wherein each of said optical amplifier units disposed in at least one of said loop back paths includes first and second optical amplifiers respectively disposed in said first and second transmission paths.

15. The apparatus of claim 14 wherein said first and second optical amplifiers are housed in a repeater.

16. The apparatus of claim 12 further comprising means for filtering said gain signature to reduce effects of secondary faults.

17. The apparatus of claim 16 wherein said filtering means comprises a limit filter.

18. The apparatus of claim 16 wherein said filtering means comprises a smoothing filter.

19. The apparatus of claim 12 wherein said directional states include level, rising and falling states.

20. The apparatus of claim 12 further comprising means for recognizing a directional state change only when a difference between said directional states exceeds a pre-established threshold.

* * * * *